(12) United States Patent
Liu et al.

(10) Patent No.: US 10,739,479 B2
(45) Date of Patent: Aug. 11, 2020

(54) INVERSION VELOCITY MODEL, METHOD FOR ESTABLISHING THE SAME AND METHOD FOR ACQUIRING IMAGES OF UNDERGROUND STRUCTURE

(71) Applicant: Institute of Geology and Geophysics Chinese Academy of Sciences, Beijing (CN)

(72) Inventors: Yike Liu, Beijing (CN); Bin He, Beijing (CN); Huiyi Lu, Beijing (CN); Zhendong Zhang, Beijing (CN)

(73) Assignee: Institute of Geology and Geophysics Chinese Academy of Sciences, Beijing (CN)

( * ) Notice: Subject to any disclaimer, the term of this patent is extended or adjusted under 35 U.S.C. 154(b) by 442 days.

(21) Appl. No.: 15/685,977

(22) Filed: Aug. 24, 2017

(65) Prior Publication Data
US 2018/0356548 A1    Dec. 13, 2018

(30) Foreign Application Priority Data

Jun. 12, 2017 (CN) .......................... 2017 1 0439203

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 2210/6222* (2013.01)

(58) Field of Classification Search
CPC . G01V 1/282; G01V 1/303; G01V 2210/6222

USPC .......................................................... 702/18
See application file for complete search history.

(56) References Cited

U.S. PATENT DOCUMENTS

| 2016/0047924 A1* | 2/2016 | Krohn ..................... G01V 1/303 703/2 |
| 2017/0115411 A1* | 4/2017 | Zhang ..................... G01V 1/282 |
| 2017/0248716 A1* | 8/2017 | Poole ........................ G01V 1/28 |

* cited by examiner

*Primary Examiner* — Michael P Nghiem
*Assistant Examiner* — Dacthang P Ngo
(74) *Attorney, Agent, or Firm* — Maier & Maier, PLLC (57) ABSTRACT

The present application relates to geophysical survey, particularly provides an inversion velocity model, a method for establishing the same and a method for acquiring images of underground structure. The method for establishing inversion velocity model comprises: converting observation seismic records into first intermediary data which contains data with frequency no higher than a first predetermined frequency; calculating synthetic seismic records based on a set initial velocity model and converting the synthetic seismic records into second intermediary data which also contains data with frequency no higher than the first predetermined frequency; establishing an objective function based on the first intermediary data and the second intermediary data; calculating a velocity gradient of seismic wave based on the objective function; calculating a iteration step of the velocity gradient; determining the inversion velocity model based on the velocity gradient and the iteration step.

7 Claims, 11 Drawing Sheets
(8 of 11 Drawing Sheet(s) Filed in Color)

INVERSION VELOCITY MODEL, METHOD FOR ESTABLISHING THE SAME AND METHOD FOR ACQUIRING IMAGES OF UNDERGROUND STRUCTURE

This application claims priority from CN 201710439203.4, filed on Jun. 12, 2017, the entire content of which is incorporated herein by reference.

TECHNICAL FIELD

The present application relates to geophysical survey or geophysical exploration, particularly provides an inversion velocity model that can be used for obtaining images of the underground structure.

BACKGROUND

The accurate imaging of the underground structure is needed in order to find a large oil deposit in the field of oil and gas exploration. To obtain the image of underground structure, it is necessary to know the velocity information of the underground structure. Geophysicists seem to have found a way to reconstruct detailed subsurface velocity, since Professor Tarantola (1984) proposed the full waveform inversion. For decades, geophysicists have published thousands of articles (Luo and Schuster, 1991; Pratt et al., 1998, 1999; Ravaut et al., 2004; Sirgue and Pratt, 2004; Plessix et al., 2010; Xu et al., 2012; Brittan et al., 2013; Warner and Guasch, 2014; Alkhalifah and Choi (2014); Wu and Luo, 2014; Xie, 2015), in order to investigate how to obtain the information of underground structure by seismic waveform. A variety of full waveform inversion methods are proposed with the improvement of computing ability of computer cluster, in which one of the most influential methods is the multi-scale waveform inversion proposed by Bunks (1995). This method starts from the low frequency data and gradually moves towards the high frequency data. However, there are two problems for almost all the researchers, one of which is that there is lack of low frequency information in seismic data. In oil and gas exploration, the main frequency of seismic data is conventionally above 15 Hz, Baeten et al., (2013) demonstrated that the frequency contents below 2 Hz are required to properly recover the low-wave number structure.

However, most current acquisition systems do not provide these low-frequency data. The second difficult problem is that the difference between the seismic synthetic data corresponding to initial model and the observation seismic records is greater than half of the wavelength in the full waveform inversion, which results in that the inversion iteration cannot converge. This requires that the initial velocity model is very close to the real model.

In view of the above-mentioned, a new solution is needed to solve the above problems.

SUMMARY

Technical Problems

The aim of the application is to provide a method for establishing underground velocity model by means of full waveform intensity inversion, which no longer need to contain low frequency information in seismic data, also does not require that the initial model and the real model error is very near.

Technical Solutions

To achieve the above purpose, a first embodiment of the present application provides a method for establishing inversion velocity model, which comprises:
  convert observation seismic records into first intermediary data which contains data with frequency no higher than a first predetermined frequency;
  calculate synthetic seismic records based on a set initial velocity model and convert the synthetic seismic records into second intermediary data which also contains data with frequency no higher than the first predetermined frequency;
  establish an objective function based on the first intermediary data and the second intermediary data;
  calculate a velocity gradient $\delta(m)$ of seismic wave based on the objective function;
  calculate a iteration step $\alpha$ of the velocity gradient $\delta(m)$;
  determine the inversion velocity model based on the velocity gradient $\delta(m)$ and the iteration step $\alpha$.

In a preferred implementation, both the first intermediary data and the second intermediary data are data capable of reflecting intensity of the seismic wave.

In a preferred implementation, the first intermediary data is square of the observation seismic records and the second intermediary data is square of the synthetic seismic records.

In a preferred implementation, the step of establishing an objective function based on the first intermediary data and the second intermediary data further includes: subject the first intermediary data and the second intermediary data to Fourier transformation, retain the portion of the first intermediary data and the second intermediary data, which has frequency no higher than the first predetermined frequency, and establish the objective function based on the portion with frequency no higher than the first predetermined frequency.

In a preferred implementation, the objective function is expressed as follows:

$$E(m) = \frac{1}{4} \| I(m) - P_0 P_0^* \|_2^2$$

wherein m is the velocity of the seismic wave, $P_0$ is the observation seismic records, $P_0^*$ is complex conjugate of $P_0$, $P_0 P_0^*$ is the first intermediary data, $P_c$ is the synthetic seismic records, $P_c$ is complex conjugate of $P_c$, $I(m)=P_c P_c^*$ is the second intermediary data.

In a preferred implementation, the step of calculating a velocity gradient of seismic wave based on the objective function further includes: calculate derivative of the objective function to the seismic wave, subject the derivative to Taylor expansion and obtain velocity gradient to be updated in accordance with the equation below:

$$\delta(m) = \frac{\partial E(m_0)}{\partial m} = F^T P_c \Delta P^2$$

Wherein $\Delta P^2 = (P_c P_c^* - P_0 P_0^*)$, $$F^T = \frac{\partial P_c(m_0)}{\partial m}$$

is first order derivative of $P_c$ with respect to $m$.

In a preferred implementation, the step of determining the inversion velocity model based on the velocity gradient δ(m) and the iteration step α further includes:

calculate value of the objective function of the present iteration and that of last iteration and comparing the two values;

stop the iteration and determine the inversion velocity model based on the result of last iteration if the value of the objective function of the present iteration is equal to or greater than that of last iteration;

determine whether the value of the objective function of the present iteration is equal to or less than convergence error β of a predetermined objective function if the value of the objective function of the present iteration is less than that of last iteration;

stop the iteration and determine the inversion velocity model based on the result of the present iteration if the value of the objective function of the present iteration is equal to or less than convergence error β of the predetermined objective function;

if the value of the objective function of the present iteration is greater than the convergence error β of the predetermined objective function, then determine an updated initial velocity model and continue the iteration until the value of the objective function becomes less than convergence error β:

$$m = m_0 + \alpha\delta(m)$$

wherein $m_0$ is initial velocity of the seismic wave.

In a preferred implementation, the first predetermined frequency is in range of 2 Hz to 5 Hz.

In a second embodiment, the present application provides an inversion velocity model established by means of the method as defined in above solutions.

In a third embodiment, the present application provides a method for acquiring images of underground structure which comprises:

obtain a underground velocity model by means of full intensity waveform inversion, with the inversion velocity model of the above solution as initial velocity model;

acquire images of underground structure based on the underground velocity model.

Technical Effects

Compared to the traditional full waveform inversion (FWI) method, the Full Intensity Waveform Inversion (FIWI) method of the present application converts the seismic data with no low frequency information (particularly super-low frequency information) into intermediary data capable of reflecting intensity of the seismic wave, constructs objective function based on the intermediary data and iterates from the low frequency data, obtaining an inversion velocity model modified from a set initial velocity model. On this basis, the present application uses the obtained inversion velocity model as the initial velocity model of the traditional full waveform inversion and acquires more accurate underground velocity structure through a series of iterations. Since the intermediary data contains low frequency information, the establishment of inversion velocity model of the present application does not require seismic data with low frequency information. In the meantime, since the inversion iteration based on low frequency information is easy to converge, the initial velocity model is not required to be very close to the real model any longer.

BRIEF DESCRIPTION OF DRAWINGS

The patent or application file contains at least one drawing executed in color. Copies of this patent or patent application publication with color drawing(s) will be provided by the Office upon request and payment of the necessary fee.

The present application will be described in detail in conjunction with an exemplary embodiment and with reference to the drawings in which.

DETAILED DESCRIPTION

Various embodiments, features and aspects of the present application will be described in detail with reference to the drawings in the following. The same reference numbers are used for the same or similar features in the drawings, which however does not mean that all figures are drawn to the scale unless otherwise indicated.

In the present application, the word "exemplary" means example or illustration. The embodiment described as exemplary should not be construed as superior to or better than other embodiments. In addition, terms such as "first", "second" are merely used for description and should not be construed as indication or implication of relative importance.

Besides, many details are provided to better illustrate the embodiments of the present application. However, it should be understood by those skilled in the art that solutions of the present application could be implemented without some details. In some embodiments, those methods and the technical means known to those skilled in the art are not described in order to highlight the essence of the present application.

Figure 1:
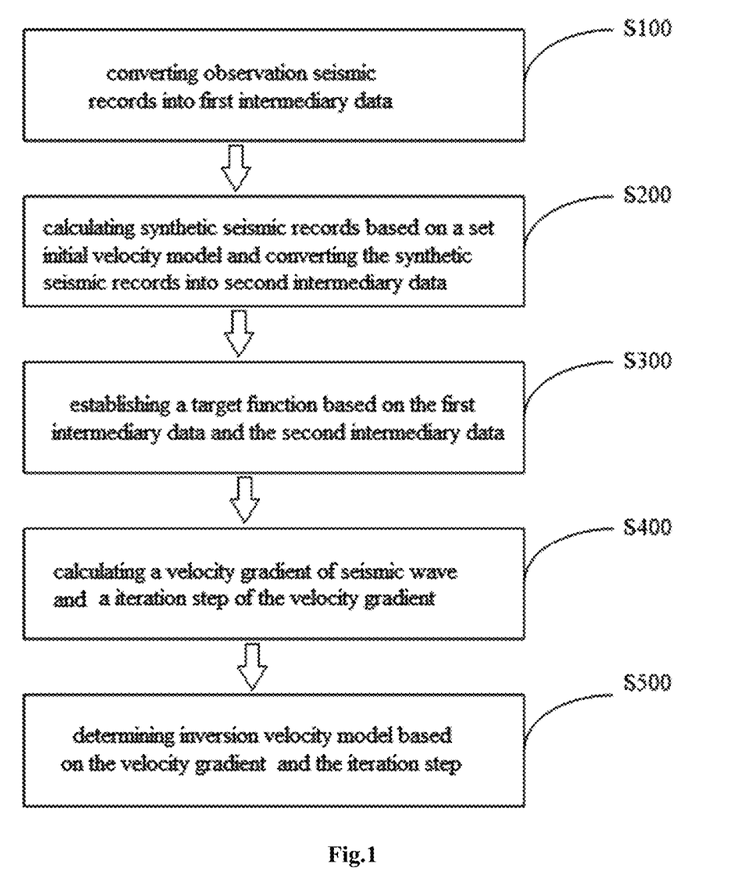
FIG. 1 shows a method for establishing underground velocity model in accordance with an embodiment of the present application.

FIG. 1 shows a method for establishing underground velocity model in accordance with an embodiment of the present application. As shown in FIG. 1, the method mainly comprises the following steps:

S100: converting observation seismic records into first intermediary data which contains data with frequency no higher than a first predetermined frequency, i.e., low frequency information; wherein the first predetermined frequency could be in the range of 2-5 Hz, the specific value of which could be adjusted as necessary. For example, 2 Hz will be used in the present embodiment to illustrate the principle of the present application, that is, low frequency information being the information with frequency no higher than 2 Hz;

S200: calculating synthetic seismic records based on a set initial velocity model and converting the synthetic seismic records into second intermediary data which also contains data with frequency no higher than the first predetermined frequency;

S300: establishing an objective function based on the first intermediary data and the second intermediary data;

S400: calculating a velocity gradient of seismic wave based on the objective function and calculating an iteration step of the velocity gradient;

S500: determining the inversion velocity model based on the initial velocity of the seismic wave, the velocity gradient and the iteration step.

As can be seen from the above steps, the present application requires no seismic data containing low frequency information for establishing inversion velocity model by means of converting the seismic data without low frequency information into intermediary data with low frequency information. Moreover, since the inversion iteration based on low frequency information is easy to converge, the present application does not demand an inversion velocity model being very close to the real velocity model.

The intensity of a wave is defined as the amount of energy that passes though unit area perpendicular to the wave direction in unit time (Born and Wolf, 1999). Extremely low frequency information is an inherent feature of seismic wave intensity. In view of this, the present application provides a full intensity waveform inversion. Different from the existing method, the present application does not need the low frequency information in seismic data and does not require that the initial inversion velocity to be close to the true velocity. In the process of establishing inversion velocity model, the present application converts observation seismic records and synthetic seismic records into first intermediary data and second intermediary data respectively which is relevant to and capable of reflecting intensity of seismic wave. Since the intensity information of seismic wave certainly contains low frequency parts and high frequency parts, the first intermediary data and the second intermediary data also contains low frequency parts and high frequency parts. After removing the high frequency parts of the first intermediary data and the second intermediary data, the low frequency parts of them are used to build the objective function and then the iteration starts from low frequency to high frequency, finally obtaining an inversion velocity model. Then the inversion velocity model is used as the initial model for full waveform inversion and obtains an underground velocity structure of higher accuracy after a series of iterations. Since the converted intermediary data certainly contains low frequency information, the inversion iteration is easy to converge and thus the present application does not demand an inversion velocity model being very close to the real velocity model.

Among others, the intensity information of the seismic wave corresponds to square of the seismic data, meaning that the changing trends of the two information are almost the same. In other words, a coefficient can be used to convert the seismic data into the intensity information of the seismic wave. Specifically, the intensity information of the seismic wave is proportional to square of the seismic data, therefore, the intensity information of the seismic wave or a value equivalent to the trend of the intensity information of the seismic wave can be directly used as intermediary data to establish objective function. In the following, the square of the observation seismic records and synthetic seismic records will be used as the first intermediary data (referred to as first seismic wave intensity data hereinafter) and the second intermediary data (referred to as second seismic wave intensity data hereinafter) respectively to illustrate the principle of the inversion velocity model establishment process of the present application.

In detail, the inversion model establishment method of the present application includes the following steps:

S1) The geophone detects a seismic record, the square of which is used as the first seismic wave intensity data. The first seismic wave intensity data contains very low frequency information. The first seismic wave intensity data is subjected to Fourier transform to decompose it into low frequency part and high frequency part and the high frequency part is removed; then inversed Fourier transform is applied to make the data return to the time domain of the seismic data, thereby obtaining seismic wave intensity data having only low frequency information.

S2) Provide an initial velocity model which can be model of any type, such as constant velocity model or linear velocity model, then use Butterworth or Ricker as the source wavelet and then apply the following seismic wave equation with finite difference to calculate the seismic synthesis record:

$$\frac{\partial^2 P}{\partial x^2} + \frac{\partial^2 P}{\partial y^2} + \frac{\partial^2 P}{\partial z^2} = \frac{1}{m_0} \frac{\partial^2 P}{\partial t^2}, \quad (1)$$

wherein P is wavefiled and t is moving time of the seismic wave; $m_0$ is initial velocity of the seismic wave; x, y, z are the space coordinates.

Apply the seismic wave equation (1) to further obtain synthetic seismic records and use square of the synthetic seismic records as the second seismic wave intensity data.

Fourier transform is used to decompose the second seismic wave intensity data for the low frequency part and high frequency part; remove the high frequency part of the second seismic wave intensity data and keep only the low frequency part; then inversed Fourier transform is applied to make the data return to the time domain of the seismic data, thereby obtaining seismic wave intensity data having only low frequency information.

S3) Building the 2 norm least squares objective function E(m) with the first seismic wave intensity data and the second seismic wave intensity data; the function is expressed as follows:

$$E(m) = \frac{1}{4} \| I(m) - P_0 P_0^* \|_2^2 \quad (2)$$

wherein m is the velocity of the seismic wave, $P_0$ is the observation seismic records, $P_0^*$ is complex conjugate of $P_0$, $P_0 P_0^*$ is the first seismic wave intensity data used as the first intermediary data, $P_c$ is the synthetic seismic records, i.e., solutions of equation (1); $P_c^*$ is complex conjugate of $P_c$; $I(m) = P_c P_c^*$ is the second seismic wave intensity data used as the second intermediary data.

S4) Since it cannot be ensured that the initial velocity model is close to the real model, the initial velocity model needs to be updated. The parameters for updating the initial velocity model include velocity gradient $\delta(m)$ of seismic wave and iteration step $\alpha$ of the velocity gradient $\delta(m)$.

S41) Based on the first seismic wave intensity data and the second seismic wave intensity data, the Taylor expansion is applied to calculate derivative of the objective function with respect to velocity in order to obtain velocity gradient equation (3) of the seismic wave, and iteration is started from the low frequency to obtain the velocity gradient of the seismic wave to be updated:

$$\delta(m) = \frac{\partial E(m_0)}{\partial m} = F^T P_c \Delta P^2 \quad (3)$$

wherein $-\Delta P^2 = (P_c P_c^* - P_0 P_0^*)$,–

$$F^T = \frac{\partial P_c(m_0)}{\partial m}$$

is first order derivative of $P_c$ with respect to m, also referred to as Frechét derivative.

Figure 2:
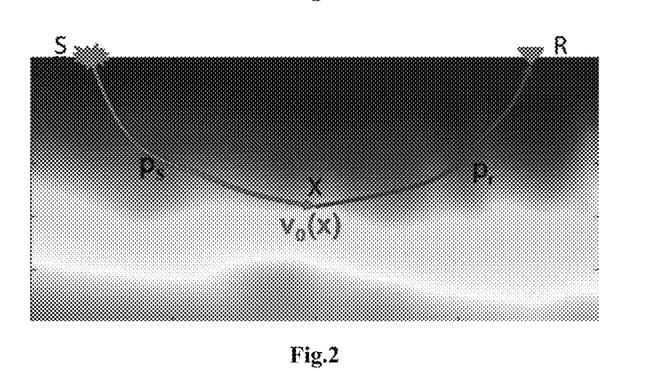
FIG. 2 shows the principle of back propagated wavefield.

S411) The seismic wavefield of the synthetic seismic records is multiplied by the difference between the first seismic wave intensity data and the second seismic wave intensity data as the adjoint source $P_c \Delta P^2$;

S412) As shown in FIG. 2, forward propagate the wavefield from S point by the two-way wave equation and calculate the two order derivative of the function of the forward propagation wavefield Ps at any location in the ground;

S413) With continued reference to FIG. 2, backward propagate the wavefield Pr from adjoint source points $P_c \Delta P^2$ by the two-way wave equation at any location in the ground;

S414) correlate Ps and Pr at any location in the ground and use equation (3) to calculate the gradient $\delta(m)$ of m;

S42) Search the iterative step length a of the gradient $\delta(m)$ by parabolic method;

S5) Set an iteration converge error; when the modified amount of $\delta(m)$ is less than the set iteration converge error after a series of iterations, the iteration is stopped and an inversion velocity model of modified $\delta(m)$ is obtained based on the initial velocity of the seismic wave $m_0$, the velocity gradient $\delta(m)$ of seismic wave and the iteration step $\alpha$ of the velocity gradient $\delta(m)$;

$$m = m_0 + \alpha \delta(m) \quad (4)$$

As can be seen from the objective function shown by equation (2), the value of the objective function is zero when the initial velocity model is completely the same as the real velocity model. Therefore, in an ideal state, the inversion velocity model obtained through the FIWI method of the present application is just the real velocity model if the value of the objective function is zero at the end of iteration.

Using the inversion velocity model obtained through S5) as the initial velocity model, a final underground velocity model is obtained after a series of iterations, such as 80 or 100 iterations. Based on the underground velocity model, the underground images are obtained, which can be used in the field of geophysical survey to ascertain the underground structure of large oil fields or make research on earth structure.

As can be seen from the above steps, since the seismic wave intensity data used as intermediary data certainly contains low frequency information, the present application requires no seismic data containing low frequency information for establishing inversion velocity model. Constructing objective function with the seismic wave intensity data and using the inversion velocity model of modified gradient as the initial velocity model to reconstruct the real velocity model, the present application does not demand an inversion velocity model being very close to the real velocity model.

Figure 3:
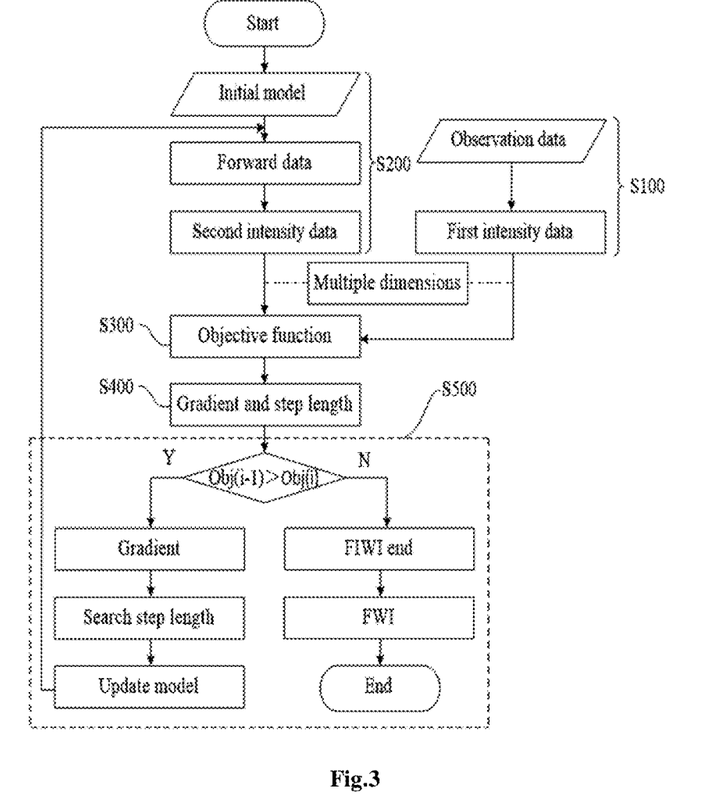
FIG. 3 is block diagram showing principle of the whole inversion process.

FIG. 3 is block diagram showing principle of the whole inversion process. As shown in FIG. 3, the whole inversion process mainly include: 1) provide an initial velocity model which can be model of any type, such as constant velocity model or linear velocity model, and use the initial velocity model to forward propagate and calculate the seismic synthesis record; 2) convert the observation data (i.e., observation records) and the forward propagate data into seismic intensity data capable of reflecting seismic intensity; specifically, convert the observation data and the forward propagate data into the first seismic wave intensity data and the second seismic wave intensity data; 3) the first seismic wave intensity data and the second seismic wave intensity data are filtered in multiple dimensions from low to high frequency, and establish corresponding objective functions. Specifically, the first seismic wave intensity data and the second seismic wave intensity data are decomposed into different frequency parts, and inversion method of different dimensions is used to calculate the modification amount of the objective function to velocity. If the value of the objective function is no less than the value of last iteration, then the iteration of the FIWI method of the present application stops. Otherwise, if the value of the objective function drops, that is, the value of the objective function is less than the value of last iteration, then calculate the iteration step length of the velocity gradient, i.e., the modification amount of the velocity, and then update the initial velocity model based on iteration step length and the velocity gradient. Then, the updated initial velocity model is used to forward propagate and calculate new forward propagate data and establish objective function based on the observation data and the new forward propagate data; after multiple iterations, the FIWI method of the present application will stop when the value of the objective function becomes less than a preset converge error β, i.e., until the value of the objective function stops dropping. The inversion velocity model obtained at the end of the iteration is the initial velocity model of the conventional FWI, which is the underground velocity model of high accuracy after a series of iterations. As can be seen from the above, different from the conventional method which uses seismic data to establish objective function, the present application uses intermediary data converted from the seismic data to establish objective function. Since the seismic wave intensity data used as intermediary data certainly contains low frequency information, the present application requires no seismic data containing low frequency information for establishing inversion velocity model, and is capable of overcoming the problem of cycle-skip during the process of seismic inversion.

In the following, two examples will be described to show the feasibility and effectiveness of the present application.

Example 1

Figure 4A:
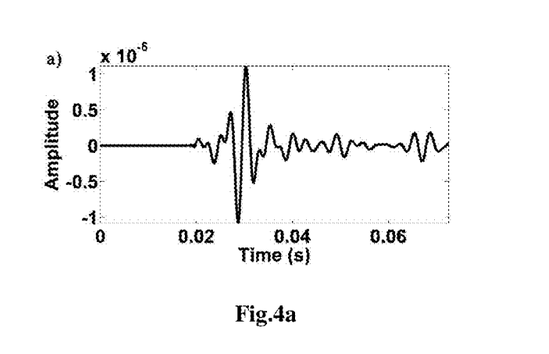
FIG. 4a is a schematic view of a trace data of first observation seismic records (crosswell data)
Figure 4B:
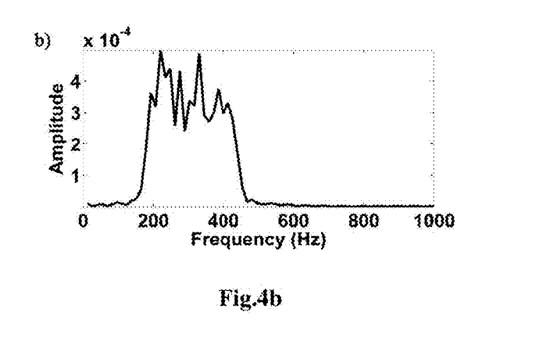
FIG. 4b shows the frequency spectrum of the trace.
Figure 4C:
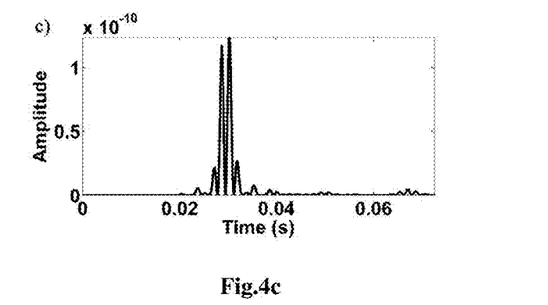
FIG. 4c shows the intensity of the trace.
Figure 4D:
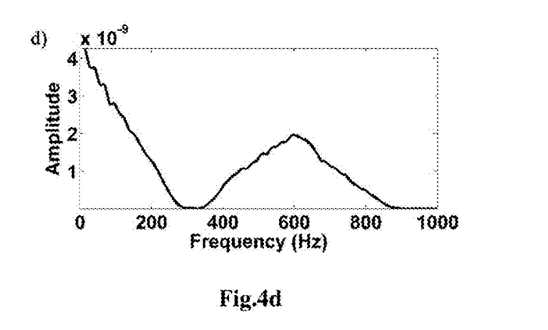
FIG. 4d shows the frequency spectrum of the trace intensity.
Figure 5A:
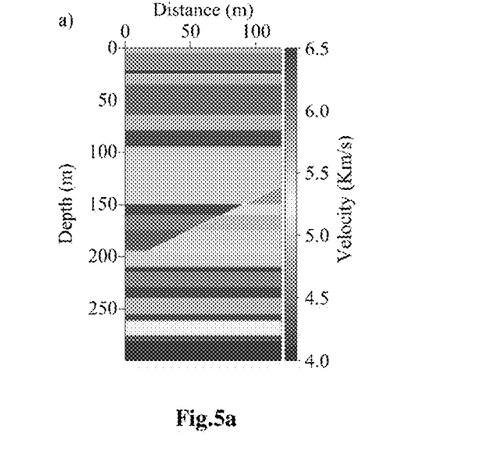
FIG. 5a schematically shows true velocity (corresponding to crosswell data)
Figure 5B:
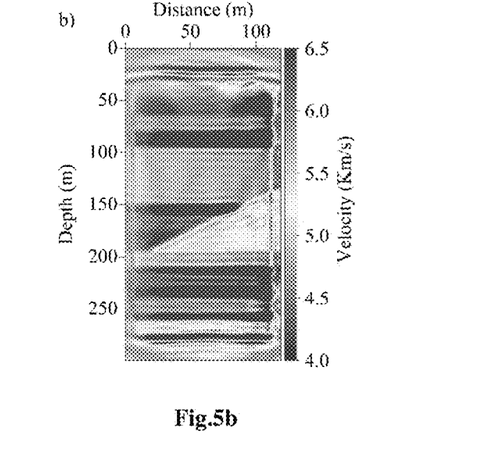
FIG. 5b shows the results of conventional FWI using velocity model of 5490 m/s as initial velocity model after 100 iterations.
Figure 5C:
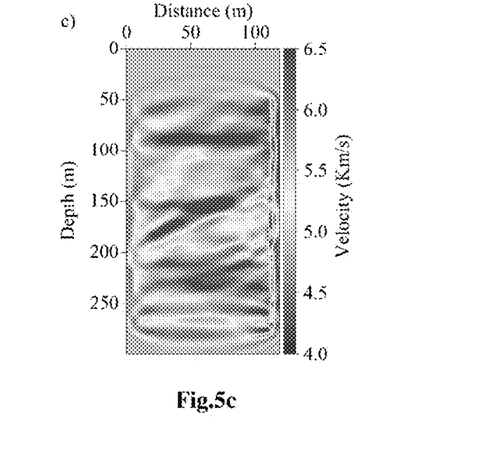
FIG. 5c shows the results of FIWI of the present application using velocity model of 5490 m/s as initial velocity model after 1 iteration.
Figure 5D:
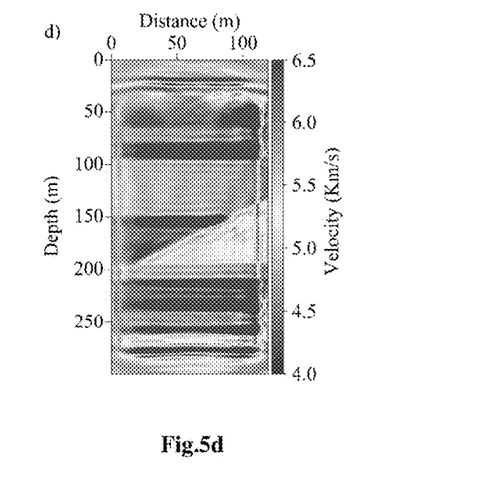
FIG. 5d shows the results of conventional FWI with the inversion result of FIG. 5c as initial model after 100 iterations.

The first example is for crosswell geometry with its velocity model shown in FIG. 5a. The model is 120 m wide by 300 m deep, discretized at a grid interval of 1 m in both horizontal and vertical directions. There are 76 sources along the left side of the model starting from x=10 m and z=50 m and 76 receivers along right side starting from x=110 m and z=50 m with the same interval of 3 m. The velocity varies from 4390 to 6160 m/s. The synthetic data set is generated by a 2D finite-difference code fourth order in space and second order in time. To limit the frequency contents in the synthetic data, a Butterworth wavelet with parameters 150-200-400-450 Hz is used to generate the synthetic data (FIG. 4a) and its frequency spectrum (FIG. 4b). Unlike a Ricker wavelet that usually has a taper at low frequency, Butterworth wavelet does not have a taper at the lowest frequency, and has as flat a frequency response as possible in the passband and keep as much same amplitude as possible for various frequencies in the synthetic data. The intensity of synthetic trace is present by the trace amplitude squared as shown in FIG. 4c and its frequency spectrum (FIG. 4d). Comparing spectra in FIGS. 4b and 4d, the intensity data have more low frequency information than the waveforms. The intensity calculation apparently splits the data spectrum into the low and high frequency parts. We will use the low frequency part to implement the FIWI of the present application. Two initial velocity models with different constant velocities are used to test how different methods can tolerate errors in initial model. We firstly use an initial model with a constant velocity of 5490 m/s and calculate for 100 iterations using the conventional FWI. The result is shown in FIG. 5b. On the other hand, the FIWI of the present application is applied to the same initial model and the intensity data after Butterworth filter applied to the intensity data. The inversion is conducted using a multi-scale style from low to high frequencies (0-0-50-100 Hz with 1 iteration, 0-0-100-150 Hz with 5 iterations, 0-0-150-200 Hz with 1 iteration) to update the velocity. The result (shown in FIG. 5c) and further used as starting model for FWI, an updated velocity is calculated using FWI after 100 iterations shown in FIG. 5d. The consistency of FIGS. 5a, 5b and 5d demonstrate that, starting from an initial model with a constant velocity of 5490 m/s, both the conventional FWI and FIWI can properly reproduce the true velocity model.

Figure 6A:
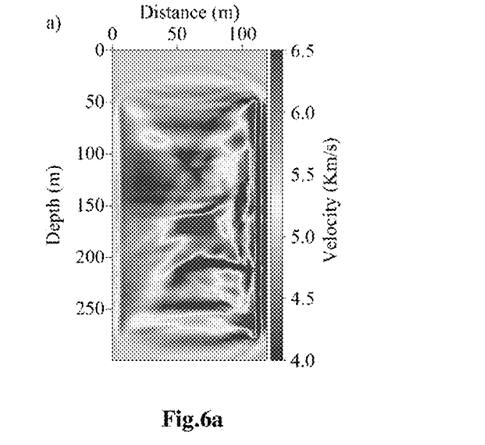
FIG. 6a shows the results of conventional FWI using velocity model of 5000 m/s as initial velocity model after multiple iterations.
Figure 6B:
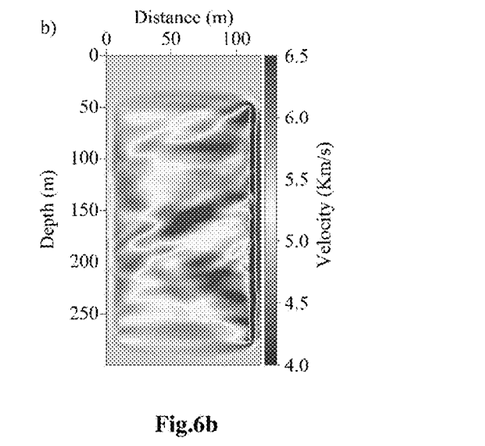
FIG. 6b shows the results of FIWI of the present application using velocity model of 5000 m/s as initial velocity model after multiple iterations.
Figure 6C:
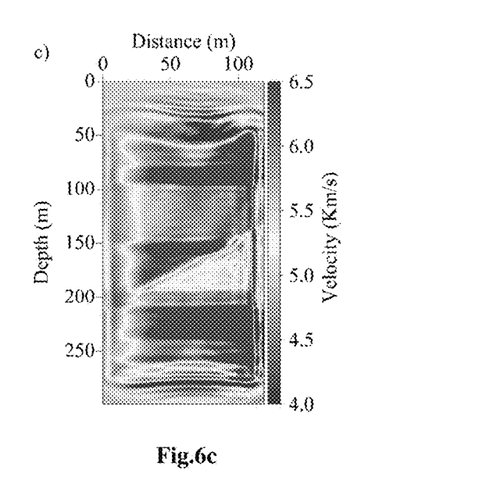
FIG. 6c shows the results of conventional FWI with the inversion result of FIG. 6b as initial model after 30 iterations.
Figure 6D:
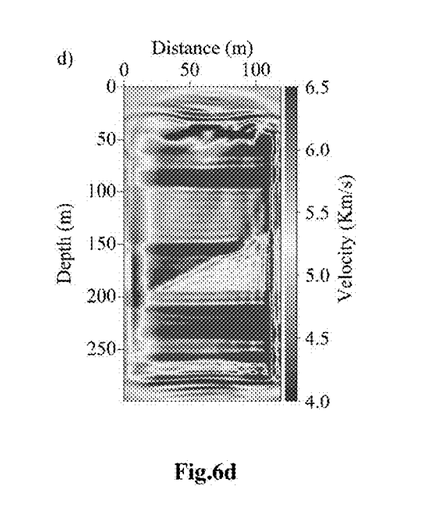
FIG. 6d shows the results of conventional FWI with the inversion result of FIG. 6b as initial model after 100 iterations.

Next, we replace the above initial velocity model by a model with a constant velocity of 5000 m/s. This new initial model has larger errors compared to the true velocity model, and is expected to cause more severe cycle skipping problems. Under this circumstance, the conventional FWI with the same data does not converge at all and exits after 9 iterations as shown in FIG. 6a. On the contrast, using intensity data filtered under 3 frequency bands by Butterworth, the velocity model updated using FIWI method of the present application in a multi-scale way (0-0-20-50 Hz for 4 iterations, 0-0-40-80 Hz for 2 iterations, and 0-0-60-120 Hz for 3 iterations) is shown in FIG. 6b. Using the above model as the starting model, we turn to use the conventional FWI for further updating. The results after 30 and 100 iterations are shown in FIGS. 6c and 6d, where most detailed structures in the original model are recovered. It demonstrates that the FIWI method of the present application based on the intensity data can largely avoid cycle skipping even in an initial model with drastic errors.

Example 2

Figure 7A:
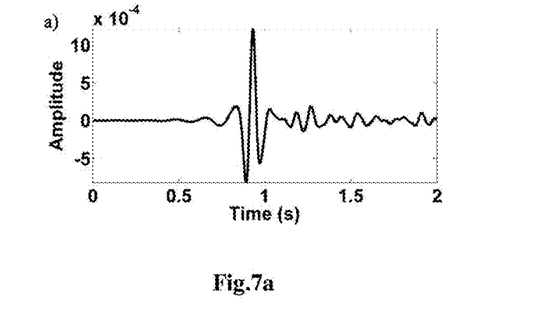
FIG. 7a is a schematic view of waveform of a trace data of second observation seismic records (ground data)
Figure 7B:
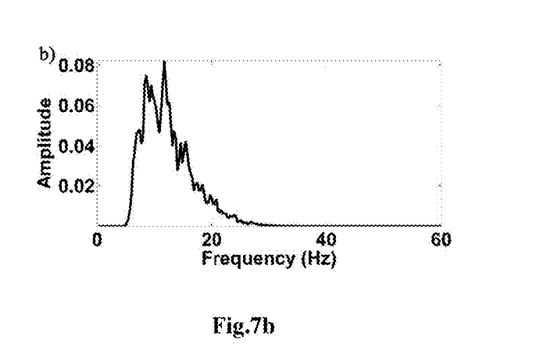
FIG. 7b shows the frequency spectrum of the trace.
Figure 7C:
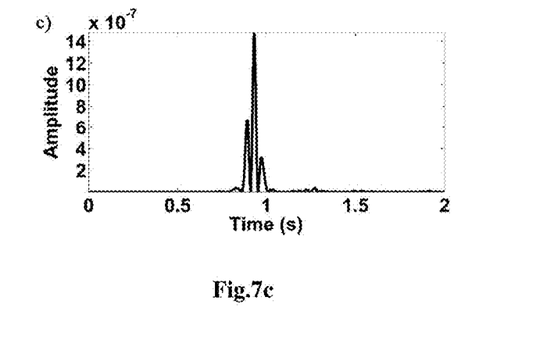
FIG. 7c shows the intensity of the trace converted from the waveform.
Figure 7D:
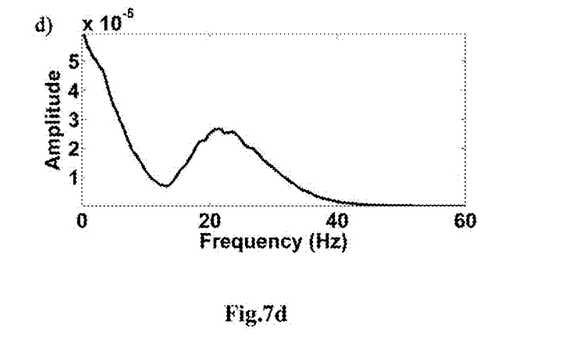
FIG. 7d shows the frequency spectrum of the trace intensity.
Figure 8A:
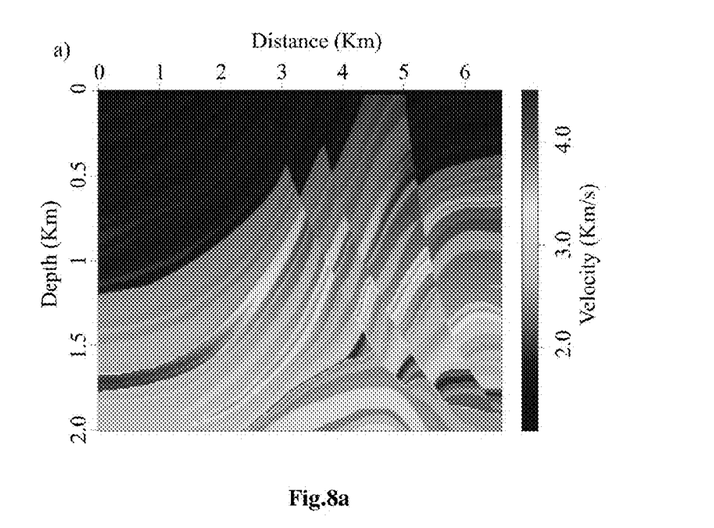
FIG. 8a schematically shows a second true velocity model (corresponding to ground data)
Figure 8B:
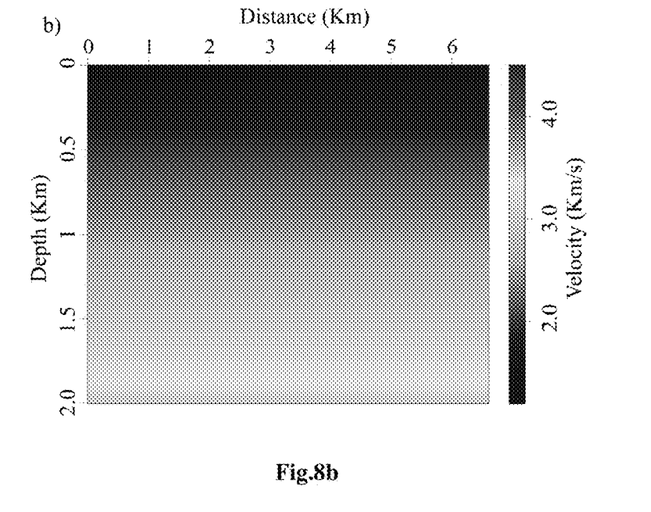
FIG. 8b is schematic view of the initial velocity model to be used in the inversion.

As the second example, we test FIWI using part of the 2D Marmousi model, which is resampled from the original Marmousi model. The model consists of 661 (horizontal) by 201 (vertical) grid points and is illustrated in FIG. 8a. A grid space of 10 m is used for both horizontal and vertical directions. We use an initial model where the velocity linearly increases from 1500 m/s at the top to 3500 m/s at the bottom (FIG. 7b). The acquisition system is composed of 111 sources, evenly located on the top of the model and with an interval of 60 m. The source time function is a 10-Hz Ricker wavelet. There are 661 receivers fixed on the top of the model at interval of 10 m. A synthetic data set is calculated from the above mentioned velocity model and the acquisition geometry. A sample trace is illustrated in FIG. 7, wherein FIG. 7a is the time-domain waveform, FIG. 7b is its frequency spectrum obtained with Butterworth filter at 5-7-9-12 frequency bandpass in which frequency contents below 5 Hz have been removed, FIG. 7c is the intensity of the trace, and FIG. 7d is the frequency spectrum of the intensity. Comparing FIG. 7b with 7d, we see the latter has more low-frequency contents.

Figure 8C:
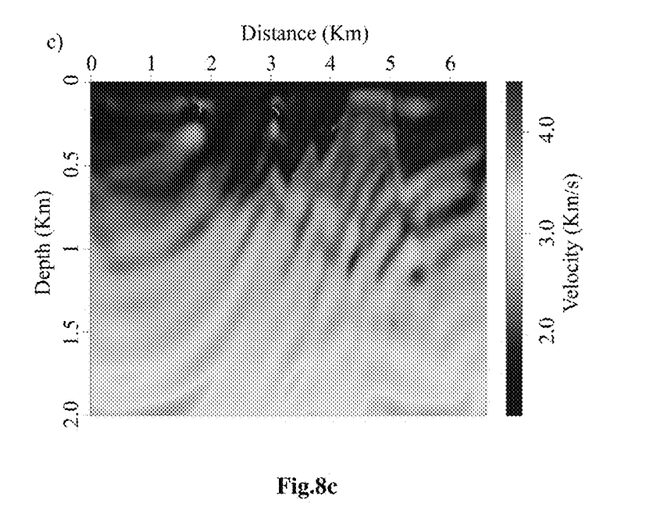
FIG. 8c shows the results of conventional FWI using the velocity model of FIG. 8b as initial velocity model after 100 iterations.

To test the capability of the FIWI method of the present application, we conduct inversion using two different work flows. In the first one, we use the conventional FWI and start from the 1D initial model. To make the inversion in a multi-scale style, the data are filtered using a series of pass-bands at 5-7 5-9, 5-11, and 5-12 Hz and successively used in the inversion with total of 100 iterations. The final result by conventional FWI is shown in FIG. 8c. Comparing FIG. 8c with 8a, although providing certain fine structures, the inverted velocity do not match the general trend of the Marmousi model, particularly, it does not match the high velocity at the deeper part. This is mainly resulted from that the data is lack of low frequency contents below 5 Hz and the initial velocity model has large errors at the deeper part.

Figure 8D:
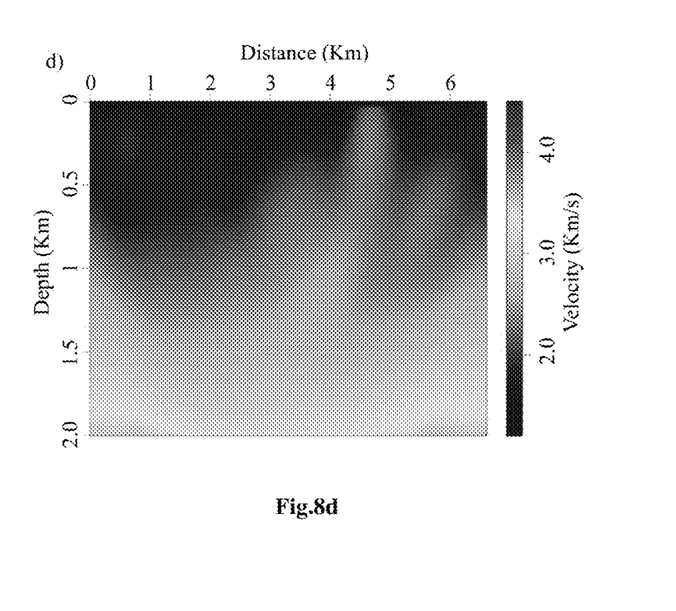
FIG. 8d shows the results of FIWI of the present application using velocity model of FIG. 8b as initial velocity model after iterations.
Figure 8E:
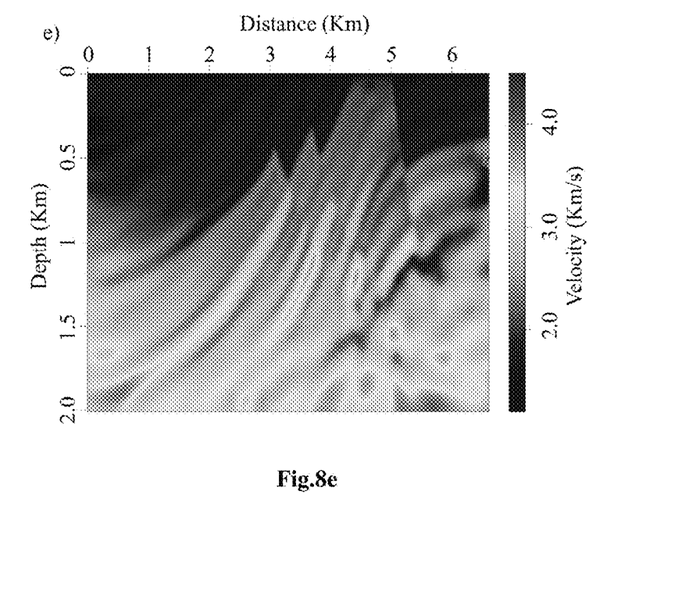
FIG. 8e shows the results of conventional FWI with the inversion result of FIG. 8d as initial model after 100 iterations.
Figure 9A:
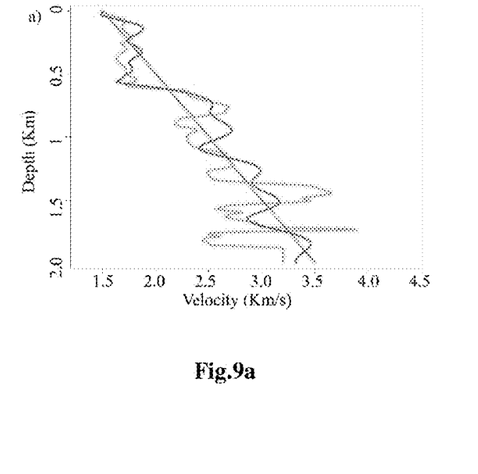
FIG. 9a shows comparisons when different velocity models are used in conventional FWI.
Figure 9B:
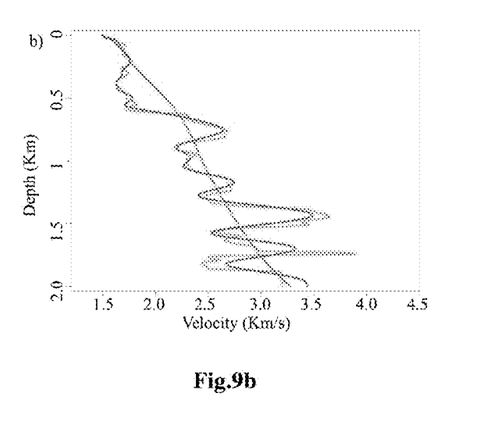
FIG. 9b shows comparisons when different velocity models are used in the FIWI of the present application.

In the second work flow, we firstly filter the intensity with Butterworth filter and apply the FIWI with 0-2 Hz intensity data on the 1-D initial model, and calculate for 95 iterations. Because the waveform intensity has very low frequency components (refer to FIGS. 7c and 7d), the FIWI generates an intermediate model, which is in low resolution but has correct long-wavelength component (shown in FIG. 8d). We then use this model as the starting model for the conventional FWI. The rest part of the work flow is the same as the first work flow. The final result obtained by the joint FIWI plus FWI is shown in FIG. 8e. By comparing FIG. 8a with 8e, it matches the true velocity model very well. FIG. 9 compares different velocity models, wherein FIGS. 9a and 9b are two vertical profiles taken at the same horizontal distance 3.3 km, and lines with different colors indicate true velocity model, 1-D initial model, result using the conventional FWI as shown in FIG. 9a; intermediate model inverted using the FIWI, and the final result using FIWI plus FWI as shown in FIG. 9b. By investigating FIGS. 8 and 9, the inverted results jointly using FIWI plus FWI reconstruct the original structure excellently. Using a more accurate intermediate velocity model as the starting model, the final result provides more balanced velocities for shallow and the deeper part of the model, as can be seen from the vertical profiles in FIG. 9. In addition, with a generally correct starting model, the fine structures in the true velocity model can be properly reproduced. For example, in FIG. 9a, there are layered dipping structures at the top 1.0 km in Marmousi model. The FIWI plus FWI method properly reproduces these layers in FIGS. 8e, 9a and 9b. However, the conventional FWI failed to generate these shallow structures in FIG. 8c.

Up to now, the technical solutions of the present application have been described in detail. The above description and embodiments are used only for the purposes of illustration of the present application, the equivalent transformation and improvement on the basis of the technical proposal of the application should not be excluded from the scope of protection of the present application.

What is claimed is:

1. A method for acquiring images of underground structure comprising:
    convert observation seismic records into first intermediary data, wherein converting includes excluding data with frequency lower than a first predetermined frequency;
    calculate synthetic seismic records based on a set initial velocity model and convert the synthetic seismic records into second intermediary data which also contains data with frequency no higher than the first predetermined frequency;
    establish an objective function based on the first intermediary data and the second intermediary data;
    calculate a velocity gradient $\delta(m)$ of seismic wave based on the objective function;
    calculate an iteration step length a of the velocity gradient $\delta(m)$;
    determine an inversion velocity model based on the velocity gradient $\delta(m)$ and the iteration step length $\alpha$;
    obtain an underground velocity model by means of full intensity waveform inversion, by iterating and progressively refining the inversion velocity model a predetermined number of times based on the iteration step length $\alpha$, with the inversion velocity model as initial velocity model;
    acquire images of underground structure based on the underground velocity model;
    wherein m is the velocity of the seismic wave;
    wherein the step of establishing the objective function based on the first intermediary data and the second intermediary data further includes:
    subject the first intermediary data and the second intermediary data to Fourier transform, retain the portion of the first intermediary data and the second intermediary data, which has frequency no higher than the first predetermined frequency, and establish the objective function based on the portion with frequency no higher than the first predetermined frequency.

2. The method as defined in claim 1, wherein both the first intermediary data and the second intermediary data are data capable of reflecting intensity of the seismic wave.

3. The method as defined in claim 2, wherein the first intermediary data is square of the observation seismic records and the second intermediary data is square of the synthetic seismic records.

4. The method as defined in claim 2, wherein the objective function is expressed as follows:

$$E(m) = \frac{1}{4} \| I(m) - P_0 P_0^* \|_2^2$$

wherein $P_0$ is the observation seismic records, $P_0^*$ is complex conjugate of $P_0$, $P_0 P_0^*$ is the first intermediary data, $P_c$ is the synthetic seismic records, $P_c^*$ is complex conjugate of $P_c$, $1(m) = P_c P_c^*$ is the second intermediary data.

5. The method as defined in claim 4, wherein the step of calculating the velocity gradient of seismic wave based on the objective function further includes: calculate derivative of the objective function with respect to the seismic wave, subject the derivative to Taylor expansion and obtain the velocity gradient to be updated in accordance with the equation below:

$$\delta(m) = \frac{\partial E(m_0)}{\partial m} = F^T P_c \Delta P^2$$

Wherein $\Delta P^2 = (P_c P_c^* - P_0 P_0^*)$, $$F^T = \frac{\partial P_c(m_0)}{\partial m}$$

is first order derivative of $P_c$ to m.

6. The method as defined in claim 2, wherein the step of determining the inversion velocity model based on the velocity gradient $\delta(m)$ and the iteration step $\alpha$ further includes:
    calculate value of the objective function of the present iteration and that of last iteration and compare the two values;
    stop the iteration and determine the inversion velocity model based on the result of last iteration if the value of the objective function of the present iteration is equal to or greater than that of last iteration;
    determine whether the value of the objective function of the present iteration is equal to or less than a convergence error $\beta$ of a predetermined objective function if the value of the objective function of the present iteration is less than that of last iteration;
    stop the iteration and determine the inversion velocity model based on the result of the present iteration if the value of the objective function of the present iteration is equal to or less than the convergence error $\beta$ of the predetermined objective function;
    if the value of the objective function of the present iteration is greater than the convergence error $\beta$ of the predetermined objective function, then determine an updated initial velocity model and continue the iteration until the value of the objective function becomes less than convergence error $\beta$:

$$m = m_0 + \alpha\delta(m)$$

wherein $m_0$ is initial velocity of the seismic wave.

7. The method as defined in claim 1, wherein the first predetermined frequency is in range of 2 Hz to 5 Hz.

* * * * *